(No Model.)

C. C. SHELBY.
SUSPENDER END.

No. 273,768. Patented Mar. 13, 1883.

Witnesses:
W. C. Jirdinston
Cha. M. Peck

Inventor:
Christopher C. Shelby
by
Melville Church
his Attorney.

UNITED STATES PATENT OFFICE.

CHRISTOPHER C. SHELBY, OF NEW YORK, ASSIGNOR OF ONE-HALF TO EMILY F. GURLEY, OF BROOKLYN, N. Y.

SUSPENDER-END.

SPECIFICATION forming part of Letters Patent No. 273,768, dated March 13, 1883.

Application filed January 22, 1883. (No model.)

*To all whom it may concern:*

Be it known that I, CHRISTOPHER C. SHELBY, of New York city, county, and State, have invented certain new and useful Improvements in Suspender-Ends; and I do hereby declare the following to be a full, clear, and exact description of the same, reference being had to the accompanying drawings, forming part of this specification, and to the figures and letters of reference marked thereon.

This invention relates to improvements in suspender-ends; and it consists in certain novel details of construction, which I will first describe, and then point out particularly in the claims at the end of this specification.

Figure 1:
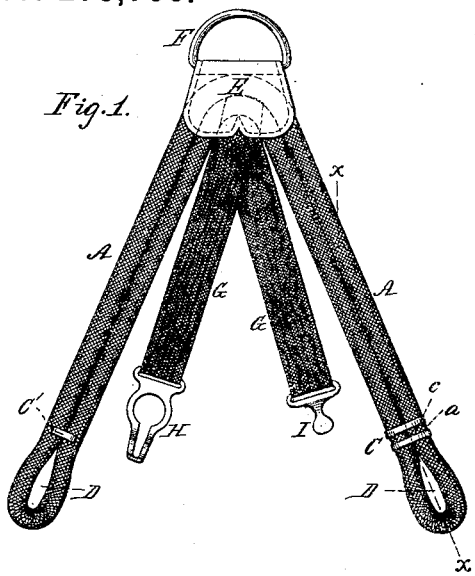
Figure 3:
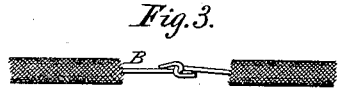
Figure 2:
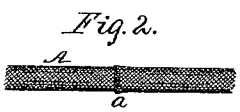
Figure 4:
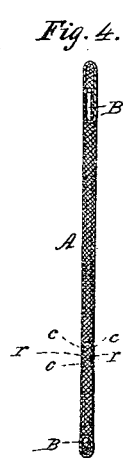
Figure 5:
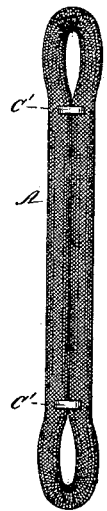

Referring to the drawings, Figure 1 represents an elevation of a suspender-end constructed in accordance with my invention. Figs. 2 and 3 are detail views, showing the manner of joining the ends of the webbing and the ends of its contained wires. Fig. 4 is a sectional view taken on the line $x\ x$ of Fig. 1. Fig. 5 represents a modification of the invention.

Similar letters of reference in the several figures denote the same parts.

A represents the single piece of webbing, containing within it a flexible wire, B, and having its ends, as well as the ends of the contained wire, secured together at $a$. The manner of securing the ends is peculiar, and is as follows: The ends of the webbing are slipped back upon the ends of the wire, so as to leave the latter projecting. The ends of the wire are then fastened together by twisting them or hooking one into the other, as shown in Fig. 3; and the ends of the webbing are then drawn up, so as to completely cover the wires and form a neat smooth joint. The webbing is then bent into curved form, as shown in Fig. 1, with its two parts parallel to each other, as also shown in said figure, and clamps C or C' are applied near the doubled ends, so as to form loops or button-holes D, one of said clamps also operating to cover the joint between the ends of the webbing and contained wire, as shown. A cap-piece, of leather or fabric, E, bearing a ring, F, is next made to embrace the parts of the webbing at the top of the arch, being secured thereto preferably by stitching, as shown. From this construction it will be seen that both of the looped ends are formed from a single piece of webbing, there being but one joint therein, and that being fully covered and protected by the clamp C, while the provision of the contained wire relieves the webbing itself from longitudinal strain, such strain being entirely borne by the contained wire. By preference I insert between the parts of the webbing at the crown of the arch and within the cap-piece a webbing, G, having upon its ends the members H I of a two-part clasp, and thus provide a drawer-supporter, which is sustained entirely by the continuous webbing and by the stitching employed to secure the cap-piece and the webbing together. The clamp C, it will be observed, has a slot, $c$, extending nearly from end to end, which, when the clamp is pressed in place upon the webbing, permits a ridge of webbing, $r$, to rise up within it, as shown in Fig. 4, and thus prevent any slipping of the clamp longitudinally upon the webbing.

Fig. 5 shows my improved mode of fastening the ends of the webbing in a form of suspender-end constructed of a continuous piece of webbing having a contained wire, and having clamps C', similar to those shown in Fig. 1, applied near the opposite ends of the webbing, so as to form two loops, one for attachment to a button or projection on the suspender-buckle, and the other for attachment to a button on the pantaloons of the wearer.

Having thus described my invention, I claim as new—

1. The single piece of webbing provided with the contained wire, and having the ends of the wire united and the ends of the webbing drawn over the joint, so as to make a neat and smooth union, and having the clamps applied near the ends, so as to form loops or button-holes, one of said clamps covering and completing the joint between the ends of the webbing, substantially as described.

2. In the herein-described suspender-end, the single piece of webbing and its contained wire, having their ends united in the manner described, the clamps applied near the ends of the webbing to form the loops, and one of the said clamps covering the ends of the webbing, the webbing carrying the drawer-clasps at its end, and held between the parts of the wired webbing by the cap-piece, the whole constructed and arranged substantially as described.

CHRISTOPHER C. SHELBY.

Witnesses:
JOHN J. SHANLEY,
GEO. B. GURLEY.